US010984079B2

United States Patent
Shakespeare et al.

(10) Patent No.: US 10,984,079 B2
(45) Date of Patent: Apr. 20, 2021

(54) INTEGRATED CONTEXT-AWARE SOFTWARE APPLICATIONS

(71) Applicant: Oracle International Corporation, Redwood Shores, CA (US)

(72) Inventors: Darryl Martin Shakespeare, Denver, CO (US); Nicole Jodie Laurent, Lakewood, CO (US); Haiyan Wang, Parker, CO (US)

(73) Assignee: Oracle International Corporation, Redwood Shores, CA (US)

( * ) Notice: Subject to any disclaimer, the term of this patent is extended or adjusted under 35 U.S.C. 154(b) by 245 days.

(21) Appl. No.: 15/879,646

(22) Filed: Jan. 25, 2018

(65) Prior Publication Data
US 2019/0228136 A1    Jul. 25, 2019

(51) Int. Cl.
*G06F 21/12*    (2013.01)
*G06F 9/451*    (2018.01)
*G06F 8/30*    (2018.01)

(52) U.S. Cl.
CPC .............. *G06F 21/125* (2013.01); *G06F 8/31* (2013.01); *G06F 9/451* (2018.02); *G06F 21/128* (2013.01)

(58) Field of Classification Search
CPC .......... G06F 21/125; G06F 9/451; G06F 8/31; G06F 21/128
USPC .......................................................... 726/26
See application file for complete search history.

(56) References Cited

U.S. PATENT DOCUMENTS

| 7,213,048 | B1 * | 5/2007 | Parupudi ........... H04L 29/12169 709/203 |
| 8,386,939 | B2 * | 2/2013 | Stevens ................. G06F 3/0484 715/740 |
| 8,943,076 | B2 * | 1/2015 | Stewart ................... G06F 16/13 707/755 |
| 10,025,565 | B2 * | 7/2018 | Garipov .................... G06F 8/34 |

(Continued)

FOREIGN PATENT DOCUMENTS

| WO | WO-2013160830 A1 * | 10/2013 | |
| WO | WO-2017031459 A1 * | 2/2017 | ............... G06F 8/34 |

OTHER PUBLICATIONS

Pole Placement Control of a Ball and Beam System A Graphical User Interface (GUI) Approach Ahmad Alkamachi ICICT : Mechanical Engineering Department of University of Bagdad, Apr. 2019, pp. 184-189 (Year: 2019).*

(Continued)

*Primary Examiner* — Samson B Lemma
*Assistant Examiner* — Mohammad S Shams
(74) *Attorney, Agent, or Firm* — Invoke

(57) ABSTRACT

Techniques for integrating context-aware software applications are disclosed. A system generates a mapping of a subset of one or more variables, managed by a parent software application, to a data structure. At runtime of the parent software application, based on the mapping, the system populates an instance of the data structure with one or more values corresponding to the subset of one or more variables. The system injects the instance of the data structure into a child software application. The system renders an interface of the child software application as a component of the parent software application. The child software application executes an operation using the one or more values from the instance of the data structure.

26 Claims, 6 Drawing Sheets

(56) References Cited

U.S. PATENT DOCUMENTS

| | | | |
|---|---|---|---|
| 2002/0180784 A1* | 12/2002 | Broussard | G06F 9/451 715/744 |
| 2005/0091184 A1* | 4/2005 | Seshadri | G06F 16/2435 |
| 2005/0091576 A1* | 4/2005 | Relyea | G06F 9/451 715/211 |
| 2006/0059088 A1* | 3/2006 | Krikorian | G06Q 10/06 705/40 |
| 2006/0101443 A1* | 5/2006 | Nasr | G06F 8/71 717/163 |
| 2007/0203922 A1* | 8/2007 | Thomas | G06F 16/258 |
| 2007/0245318 A1* | 10/2007 | Goetz | G06F 19/00 717/135 |
| 2007/0276875 A1* | 11/2007 | Brunswig | G06F 8/38 |
| 2010/0077007 A1* | 3/2010 | White | G06F 16/284 707/791 |
| 2012/0324359 A1* | 12/2012 | Lee | G06F 8/38 715/733 |
| 2013/0091513 A1* | 4/2013 | Underdal | G06F 9/4843 719/328 |
| 2015/0046902 A1* | 2/2015 | Kumar | G06F 9/4484 717/114 |
| 2015/0350016 A1* | 12/2015 | Gundugola | H04L 41/145 709/223 |
| 2017/0052766 A1* | 2/2017 | Garipov | G06F 8/34 |
| 2017/0060558 A1* | 3/2017 | Koushik | G06F 8/61 |
| 2017/0329506 A1* | 11/2017 | Laetham | G06T 11/60 |
| 2018/0349482 A1* | 12/2018 | Oliner | H04L 41/22 |
| 2019/0095225 A1* | 3/2019 | Nandagopal | G06F 40/14 |

OTHER PUBLICATIONS 2-tier vs. 3-tier Architectures for Data Processing Software Dimitriy Dorofeev, Sergey Shestaskov ICAIT'18: Proceeding of Software and its Engineering. Nov. 2018, pp. 63-68 (Year: 2018).*

* cited by examiner

INTEGRATED CONTEXT-AWARE SOFTWARE APPLICATIONS

TECHNICAL FIELD

The present disclosure relates to software applications. In particular, the present disclosure relates to integrating software applications.

BACKGROUND

A software application (or "application" for short) is a computer program that provides a cohesive set of functionality to one or more users. Examples of software applications include email applications, multimedia applications such as music and/or video players, task management applications, calendar applications, contact management applications, messaging applications, word processing applications, spreadsheet applications, presentation applications, financial applications, videoconferencing applications, etc. Some software applications includes business management and/or operations functionality. Examples include human resources and/or payroll applications, supply chain management applications, project management applications, etc.

A software application may include multiple features. For example, a payroll application typically includes multiple features relating to employee compensation. A payroll application may include one or more features to track and manage employee vacation time, one or more features to track and manage employee payroll deductions, etc. Typically, to add a feature to a software application, a developer edits the software application's source code. The developer compiles a new version of the software application from the edited source code. This process for adding a feature to a software application may be time-consuming and laborious. In addition, editing a software application's source code carries a risk of introducing bugs, i.e., broken or flawed behavior, in the software application. Editing the source code to add a new feature may introduce bugs in other features that did not previously have those bugs. Moreover, to introduce the same feature to multiple software applications, the source code for each software application must be edited and recompiled separately.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. INTEGRATING CONTEXT-AWARE SOFTWARE APPLICATIONS
4. ILLUSTRATIVE EXAMPLES
5. MISCELLANEOUS; EXTENSIONS
6. HARDWARE OVERVIEW
7. COMPUTER NETWORKS AND CLOUD NETWORKS
8. MICROSERVICE APPLICATIONS

1. General Overview

One or more embodiments include techniques for integrating context-aware software applications. A system of context-aware software applications may include a parent software application and a child software application. An interface of the child software application, as referred to herein, is integrated as part of the parent software application. The parent software application provides the context that is used for execution of the child software application.

The context may be defined, at least in part, by an instance of a data structure populated with a corresponding set of values. In the data structure, variables managed by the parent software application are associated with corresponding variables used by the child software application. The instance of the data structure includes runtime values of one or more of the variables managed by the parent software application. The parent software application may inject the instance of the data structure into the child software application. The child software application uses this injected instance of the data structure to execute operations. The child software application's interface is rendered as part of the parent software application.

One or more embodiments described in this Specification and/or recited in the claims may not be included in this General Overview section.

2. Architectural Overview

Figure 1:
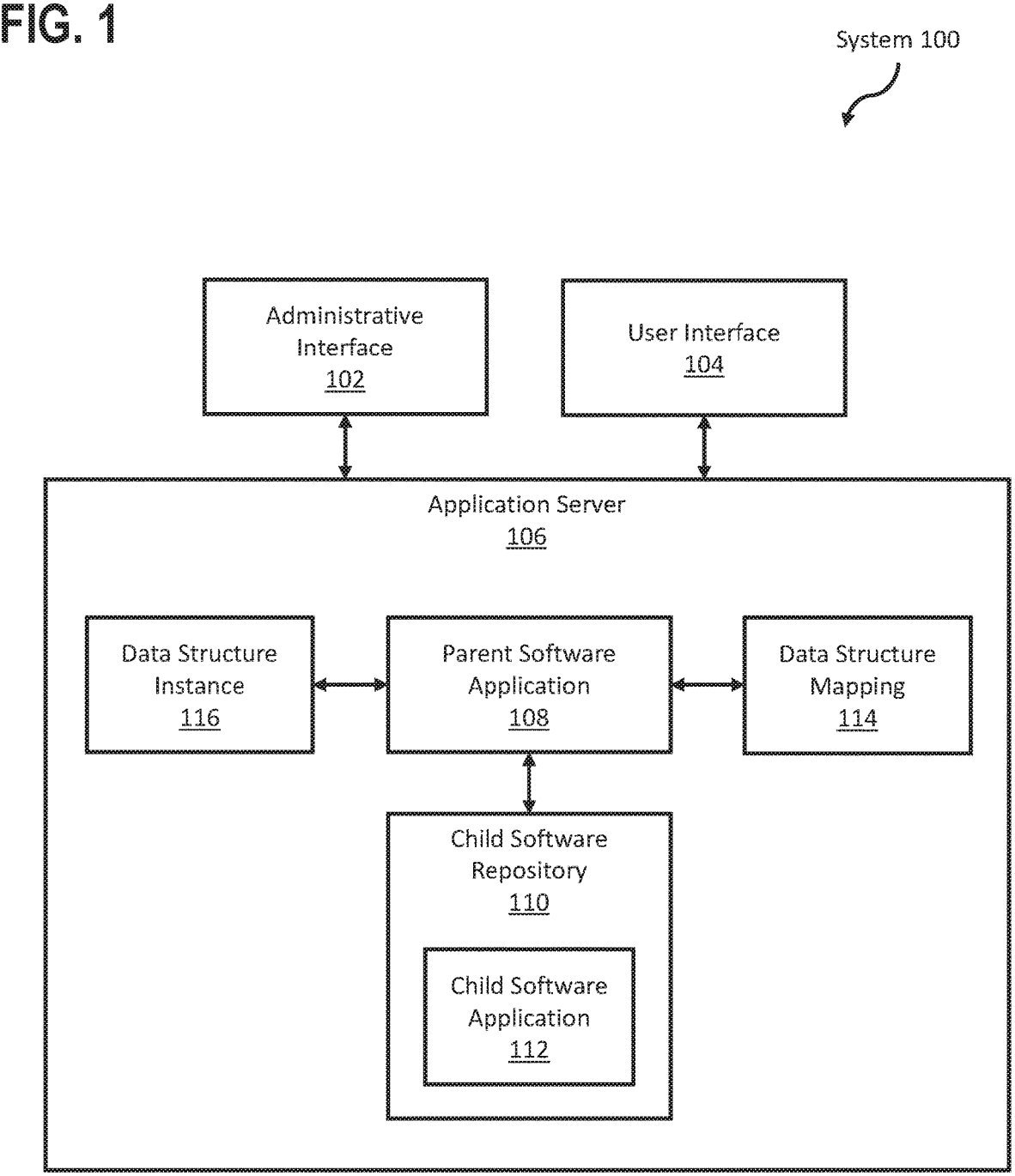
FIG. 1 illustrates a block diagram of a system in accordance with one or more embodiments.

FIG. 1 illustrates a system 100 in accordance with one or more embodiments. As illustrated in FIG. 1, system 100 includes an application server 106, an administrative interface 102, a user interface 104, and one or more components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In the following discussion, the terms 'parent' and 'child' describe an integration relationship between two different software applications. Specifically, a child software application 112 is integrated into a parent software application 108. The terms 'parent' and 'child' are not intended to denote any other kind of relationship between the two software applications. The parent software application 108 and child software application 112 may be written in different programming languages, written by different developers, supplied by different organizations and/or vendors, etc.

In one or more embodiments, an application server 106 refers to hardware and/or software configured to perform operations described herein for integrating context-aware software applications. Examples of operations for integrating context-aware software applications are described below. Specifically, the application server 106 may include hardware and/or software configured to integrate a child software application 112 with a parent software application 108.

In an embodiment, integrating context-aware software applications involves performing operations based on user input. The application server 106 may receive user input via an administrative interface 102 and/or a user interface 104. In one or more embodiments, the administrative interface 102 and/or user interface 104 refer to hardware and/or software configured to facilitate communications between a user and the parent software application 108. The administrative interface 102 and/or user interface 104 render interface elements and receive input via interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, an administrative interface 102 is an interface that allows a user to control, via user input, administrative features of the application server 106. Administrative features may include operations for integrating a child software application 112 with a parent software application 108, as discussed below. A user interface 104 may allow a user to interact, via user input, with non-administrative features of the application server 106. Non-administrative features of the application server 106 include one or more non-administrative features of the parent software application 108. The administrative interface 102 and user interface 104 may both be accessible under a single set of user credentials (i.e., username, password, group membership, security authorization, and/or any other type of credentials used to differentiate between the features accessible to different users). Alternatively or in addition, one or more administrative functions, accessible via the administrative interface 102, may require different user credentials.

In an embodiment, the application server 106 includes a child software repository 110. The child software repository 106 is configured to store one or more child software applications (e.g., child software application 112). The child software application 112 includes a set of code that may be integrated into the parent software application 108 using techniques described herein. A child software repository 110 may be any type of storage unit and/or device (e.g., a file system, database, collection of tables, or any other storage mechanism) for storing data. Further, a child software repository 106 may include multiple different storage units and/or devices. The multiple different storage units and/or devices may or may not be of the same type or located at the same physical site. Further, a child software repository 106 may be implemented or may execute on the same computing system as the application server 106. Alternatively or additionally, a child software repository 106 may be implemented or executed on a computing system separate from the application server 106. A child software repository 106 may be communicatively coupled to the application server 106 via a direct connection or via a network.

In an embodiment, the parent software application 108 is configured to generate a data structure mapping 114. The data structure mapping 114 describes a mapping between variables that are used by the parent application 108 and variables that are used by the child software application 112. For example, the parent software application 108 may use a variable named 'var_A' and the child software application may use a variable named 'var_B.' The data structure mapping 114 may include a mapping between variable var_A and variable var_B. The data structure mapping 114 may be stored in a database, extensible markup language (XML) file, comma-separated value (CSV) list, or in any other type of storage that permits a mapping of one variable to another variable. In an embodiment, a user is able to define and store the data structure mapping 114 by supplying user input to the administrative interface 102.

In an embodiment, the parent software application 108 is configured to generate a data structure instance 116 based on the data structure mapping 114. The data structure instance 116 includes one or more specific value(s) of variables of the parent software application 108, mapped to variables of the child software application 112. The specific value of the variable is a value that is generated and/or available at runtime of the parent software application 108. In the preceding example, a data structure instance 116 may include a specific value of variable var_A, mapped to variable var_B. The data structure instance 116 may be stored as an XML, file, an object in an object-oriented programming language, a code snippet (e.g., a snippet of code in a scripting language such as JavaScript), or in any other type of storage that permits a mapping of a specific value of one variable to another variable.

In an embodiment, the parent software application 108 is configured to integrate the child software application 112 into the parent software application 108. The parent software application 108 may be configured to inject a data structure instance 116 into the child software application 112. Injecting a data structure 116 into the child software application 112 makes the specific value(s) of the variable(s) from the parent software application 108 available for use by the child software application 112. The values of the parent software application 108 that are available to the child software application 112, via the injected data structure instance 116, may be referred to as the parent software application 108's 'context.' The integration of the child software application 112 with the parent software application 108 is 'context-aware.' The child software application 112 is aware, via the injected data structure 116, of the parent software application 108's context. The child software application 112 may use that context in functionality of the child software application 112.

In an embodiment, components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Integrating Context-Aware Software Applications

Figure 2:
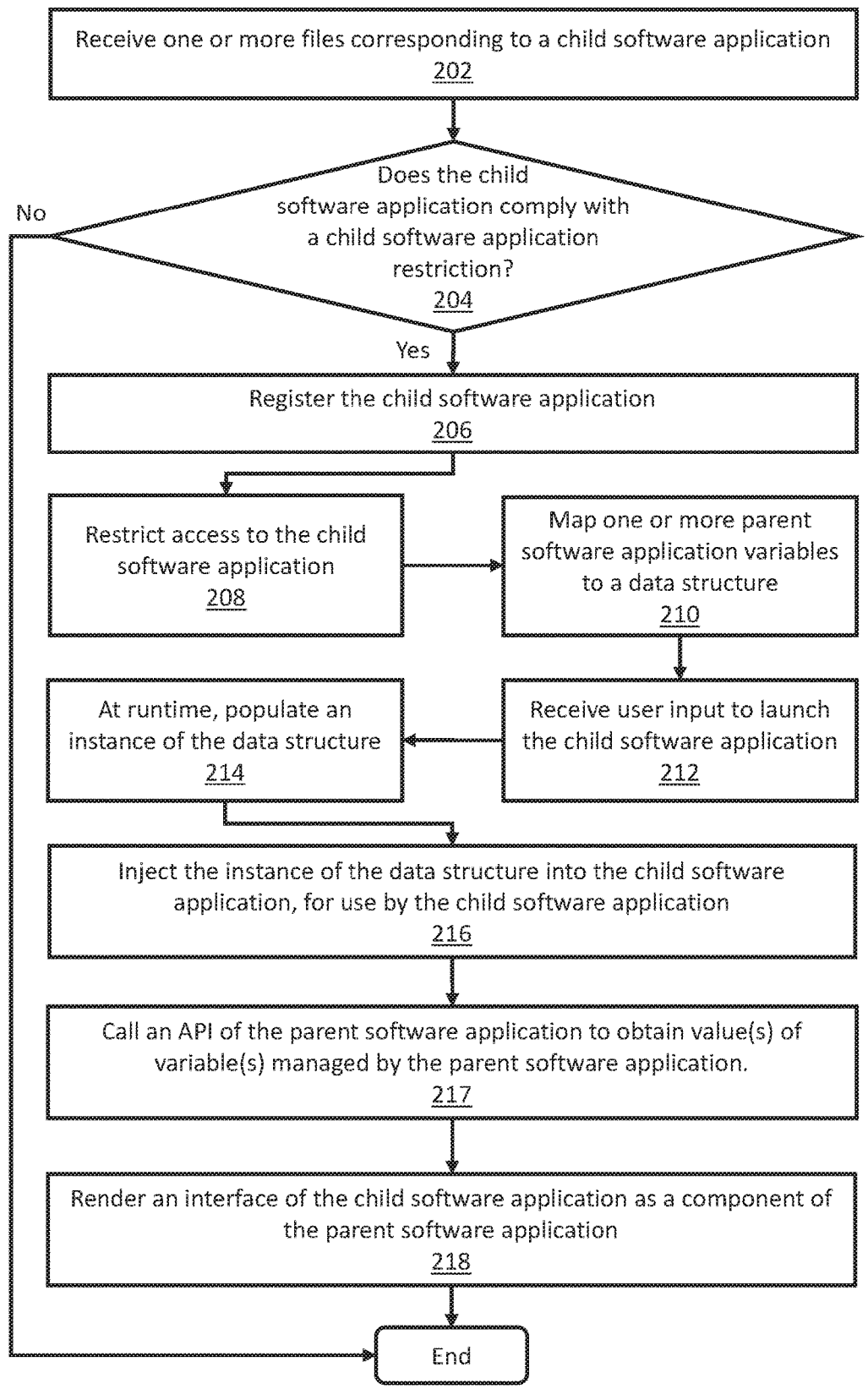
FIG. 2 illustrates a set of operations for integrating context-aware software applications in accordance with one or more embodiments.

FIG. 2 illustrates an example set of operations for integrating context-aware software applications in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system receives one or more files corresponding to a child software application (Operation 202). The file(s) include code that defines the child software application's functionality. In an example, the system may receive the file(s) via an administrative interface. The administrative interface may include interface elements that allow the user to select the file(s) corresponding to the child software application and upload the file(s) to a child software repository. The user may upload the child software application as a compressed file that includes multiple files, which are extracted at the server.

In an embodiment, the system determines whether the child software application complies with a child software application restriction (Operation 204). A child software application restriction defines one or more preconditions or restrictions for using the child software application in the system. In an example, a child software application includes functionality to access a database. A child software application restriction may prohibit code that presents a database security risk, such as structured query language (SQL) injection code. In another example, a child software application includes functionality to make system calls, i.e., execute operations provided by the system's operating system. A child software application restriction may prohibit code that attempts to execute certain system calls and/or system calls that require administrative credentials. If the child software application does not comply with a child software application restriction, the system may refuse to store the child software application. Alternatively or in addition, the system may refuse to integrate some or all of the child software application's functionality with a parent software application.

In an embodiment, the system registers the child software application (Operation 206). Registering the child software application involves making the child software application available, via an administrative and/or user interface, for integration with a parent software application. In an example, the parent software application maintains a list of child software applications that are available for integration with the parent software application. The parent software application may present the list to a user, via an administrative interface, in a menu, dropdown list, select box, checklist, or some other interface element. Registering the child software application may involve adding the child software application to the list.

In an embodiment, not all users of the parent software application have access to all child software applications. The system may restrict access to the child software application (Operation 208). Initially, the system may make the child software application available to administrative users of the parent software application. An administrative user may subsequently configure the parent software application available to other users. Different child software applications may be accessible to different users and/or groups of users, depending on security roles assigned to those users/groups and corresponding permissions associated with the different child software applications.

In an embodiment, the system maps one or more parent software application variables to a data structure (Operation 210). Specifically, the system maps the parent software application variable(s) to a data structure in which the parent software application variable(s) are associated with one or more corresponding child software application variables. The mapping may be based on the names of the corresponding variables, such that the name of a variable managed by the parent software application is associated to the name of a variable managed by the child software application. In an example, the parent software application manages a variable named "EmployeeBirthDate" and the child software application manages a variable named "PersonBirthDate." The system maps the "EmployeeBirthDate" variable to a data structure in which the "PersonBirthDate" variable is associated with the child software application's "PersonBirthDate" variable. In this manner, the data structure indicates that values of the parent software application's "EmployeeBirthDate" variable will be supplied to the child software application using the "PersonBirthDate" variable name.

In an embodiment, the system receives user input to launch the child software application (Operation 212). The system receives the user input via a user interface. The user interface may be an interface that is natively part of the parent software application. Alternatively, the user interface may be an interface of a child software application (different from the child software application being launched) that is integrated into the parent software application described herein. One child software application may include functionality to launch another child software application.

In an embodiment, at runtime, the system populates an instance of the data structure (Operation 214). Specifically, the system populates an instance of the data structure with values of the parent application variable(s) mapped to the data structure. The system populates the instance of the data structure based on the mapping, which indicates the association(s) between variable(s) of the parent software application and variable(s) of the child software application. Continuing the example above, at runtime, the parent software application stores a particular value of the "EmployeeBirthDate" variable, e.g., "08/10/1968." The system generates an instance of the data structure and populates the instance of the data structure with the runtime value of the "EmployeeBirthDate" variable. The system may populate the instance of the data structure upon receiving input to launch the child software application (i.e., Operation 212). Alternatively or in addition, the system may populate one or more instances of data structures on an ongoing basis, at runtime, as preparation for potentially launching a child software application.

In an embodiment, the specific value(s) used to populate an instance of a data structure depend on user input. In the example above, a user may select an interface element associated with a particular employee record, causing that employee's birth date to be populated in the instance of the data structure. If the user selects an interface element associated with another employee record, the other employee's birth date may be populated in the instance of the data structure. The system may populate multiple instances of the same data structure, representing multiple instances of the same runtime variable (e.g., multiple instances of an "EmployeeBirthDate" variable corresponding to multiple employees).

In an embodiment, the parent software application injects the instance of the data structure into the child software application, for use by the child software application (Operation 216). The parent software application may inject the instance of the data structure into the child software application in many different ways. If the child software application renders an interface as hypertext markup language (HTML), the system may inject the instance of the data structure into the child software application as scripting language in the HTML code. In an example, the child software application includes server-side code to generate HTML code for rendering an HTML interface. The parent software application populates an instance of a data structure in which the value of a variable managed by the parent software application is associated with the name of a variable managed by the child software application. The parent software application generates a client-side script (e.g., JavaScript) that includes the instance of the data structure. The instance of the data structure may be represented as a JavaScript Object Notation (JSON) object, for example. The parent software application injects the client-side script into the header of the child software application's HTML code.

Alternatively or in addition, the system may inject an instance of a data structure into a child software application via a query string. The query string includes data corresponding to the instance of the data structure, such as the value(s) of one or more variables and the associated name(s) of one or more variables managed by the child software application. The query string may be presented to a user as part of a hyperlink. For example, a user may receive, in an email, a hyperlink with a query string corresponding to an instance of a data structure. When the user selects the hyperlink, the user is directed to the parent software application. The parent software application injects the instance of the data structure into the child software application based on the query string. The parent software application renders an interface of the child software application as a component of the parent software application. Continuing the example above, a user may receive an email with a hyperlink to view details about a particular employee record. The hyperlink includes a query string with the name of the child software application variable "PersonBirthDate" and the associated value supplied by the parent software application.

Alternatively or in addition, the parent software application may inject one or more user interface controls and/or other elements into the child software application. The user interface controls may serve to provide particular functionality and/or visual consistency with the parent software application. The parent software application may inject a cascading stylesheet (CSS) file into the child software application. Injecting a CSS file into the child software application may cause elements of the child software application's interface and the parent software application's interface to have similar styles.

Alternatively or in addition, the parent software application may expose an application programming interface (API) for obtaining values of one or more variables managed by the parent software application. The API may be a representational state transfer (REST) API or any other type of API. The child software application may include code to call the API to obtain one or more variable values (Operation 217) corresponding to a context of the parent software application in which the child software application is being launched. In an embodiment, an instance of the data structure is injected into the child software application as described above. The child software application uses one or more values from the instance of the data structure as a parameter for calling the parent software application's API. A parameter passed from the child software application to the parent software application's API may be thought of as a "filter value," because the API returns only values that are selected (i.e., filtered) from available context data based on the passed-in parameter value(s). The API returns context data that the child software application uses to populate and/or replace values already stored in the instance of the data structure.

In an embodiment, the system renders an interface of the child software application as a component of the parent software application (Operation 218). The system may render the interface of the child software application as an iframe in an interface of the parent software application. By using an iframe, the interface of the child software application may appear as though it were a native part of the parent software application. Alternatively or in addition, the system may render the interface of the child software application as an interface widget in the parent software application's interface. An interface widget is an interface element configured to receive user input, such as a button, text box, multimedia interface, or any other type of element able to receive user input and perform operations responsive to the user input. Alternatively or in addition, the system may render the interface of the child software application in a separate window (e.g. a pop-up) that is visually associated with the interface of the parent software application. The child software application executes one or more operations based on the parent software application's context, i.e., based on one or more runtime values of variables in the instance of the data structure supplied by the parent software application. Continuing the example above, the child software application may render a retirement investment projection based on the value of the "PersonBirthDate" variable, which was populated with the runtime value of the parent software application's "EmployeeBirthDate" variable.

In the description above, a single child software application's interface is rendered as a component of a parent software application. A particular parent software application may support multiple child software applications. The system may render multiple child software application interfaces simultaneously and/or at different times from each other as components of the same parent software application. The system may render multiple iframes and/or pop-up windows and inject different instances of the same data structure into the different iframes and/or pop-up windows. Continuing the example above, the system may render different instances of the child software application's interface corresponding to different employee records.

In an embodiment, a child software application is integrated as a context-aware component of a parent software application without needing to modify or recompile source code of the parent software application. The child software application may provide functionality that is not already included in the parent software application. For example, the child software application may allow a user to visualize and/or manipulate data from the parent software application in a way that is not already available in the parent software application itself. The child software application may be written in a different programming language, which may provide additional flexibility for developers who are designing child software applications. A child software application may be portable between different parent software applications. For example, a software vendor may develop a child software application and distribute the child software application to multiple customers. A particular parent software application may support multiple child software applications. Embodiments may allow for users to customize a parent software application, through the addition, modification, and/or removal of child software applications, without requiring access to the parent software application's source code.

4. Illustrative Examples

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
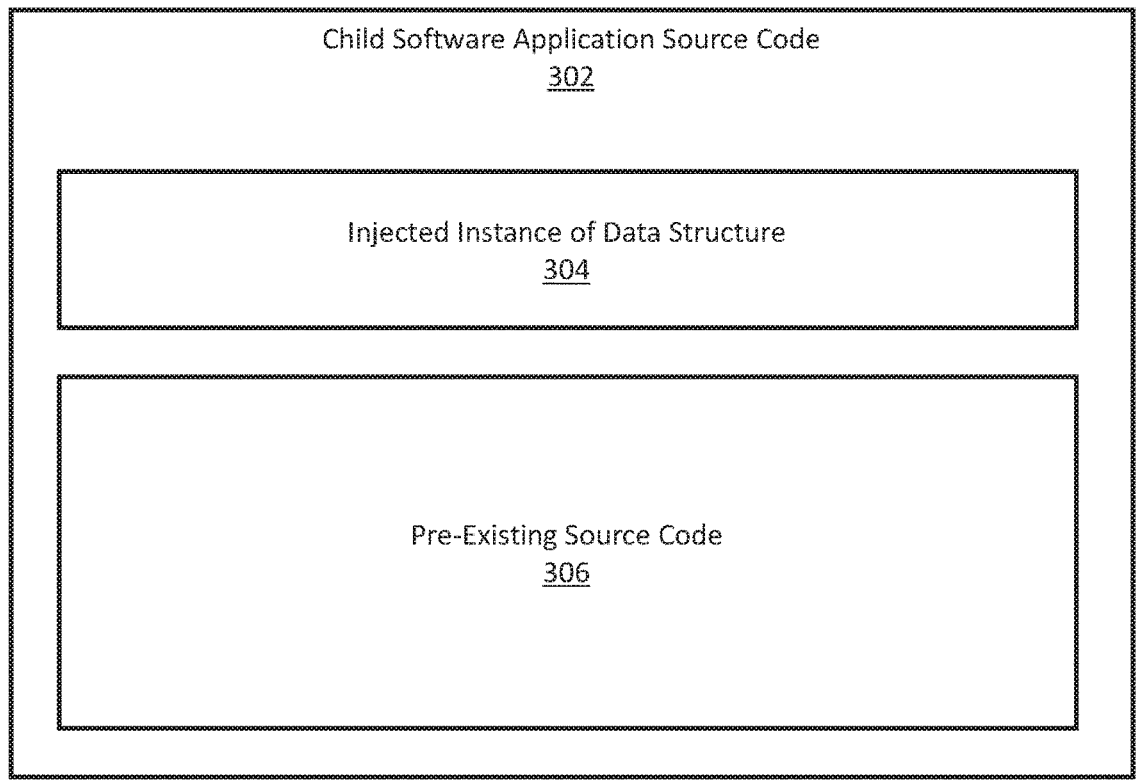
FIG. 3 illustrates a block diagram of child software application source code in accordance with one or more embodiments.

FIG. 3 illustrates a block diagram of child software application source code 302 in accordance with one or more embodiments. In FIG. 3, child software application source code 302 includes pre-existing source code 306. A parent software application (not shown) injects an instance of a data structure into the child software application's source code 302, after which the child software application source code 302 also includes an injected instance of the data structure 304. For example, the pre-existing source code 306 may include HTML code rendered by a server-side process, and the injected instance of the data structure 304 may include a JSON data structure injected as scripting language into an HTML header.

Figure 4:
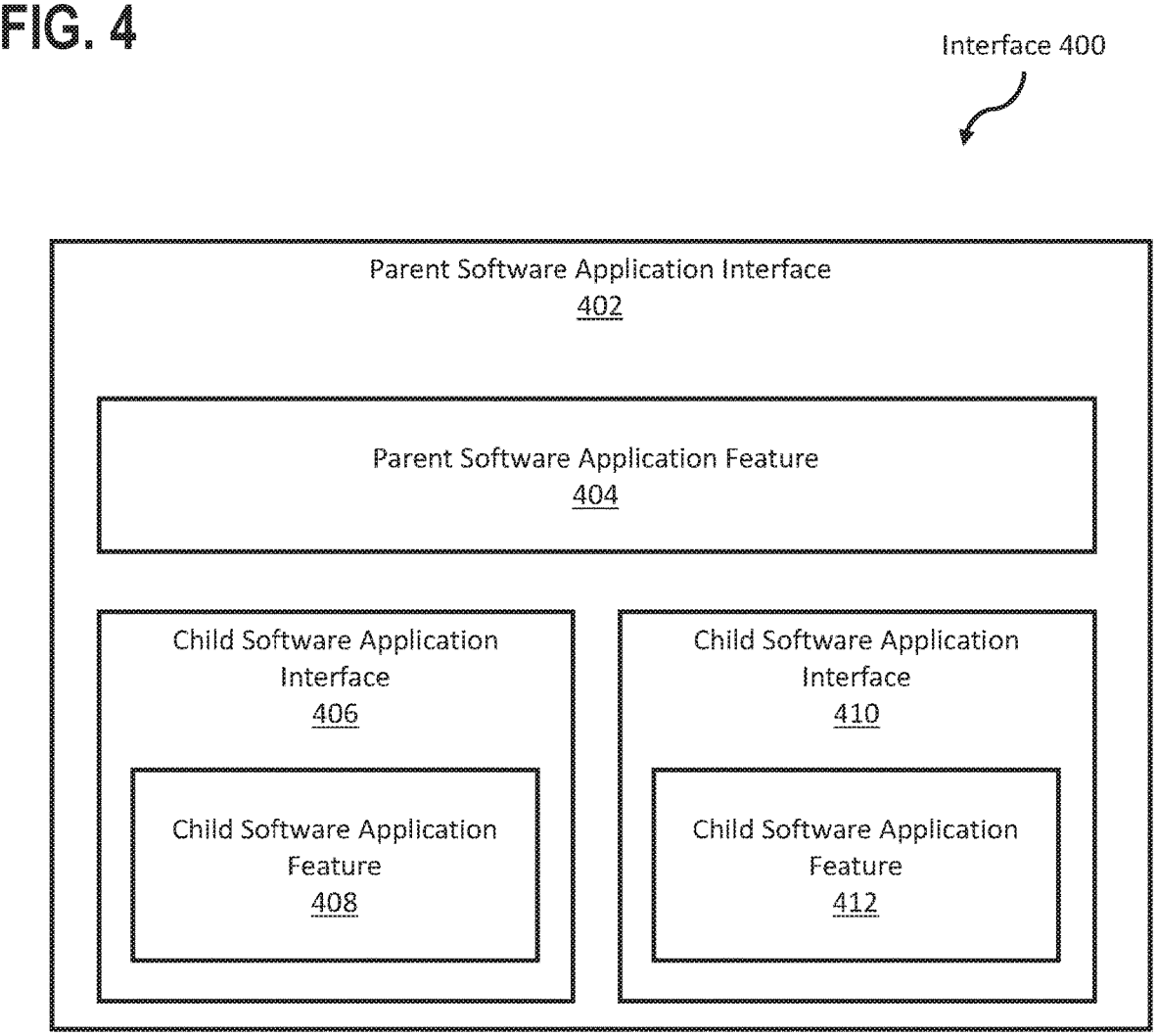
FIG. 4 illustrates an interface in accordance with one or more embodiments.

FIG. 4 illustrates an interface 400 in accordance with one or more embodiments. As illustrated in FIG. 4, a parent software application interface 402 includes a parent software application feature 404. The parent software application feature 404 is a feature that is native to the parent software application and rendered as part of the parent software application interface 402, regardless of whether any child software application is/are integrated with the parent software application. In this example, two different child software application interfaces 406, 410 are integrated into the parent software application interface 402. The child software application interfaces 406, 410 are rendered inline with the parent software application interface 402, such as in an iFrame. Each child software application interface 406, 410 includes a respective child software application feature 408, 412. The child software application features 408, 412 include functionality that is based, at least in part, on context supplied by the parent software application via injected instances of data structures.

Figure 5:
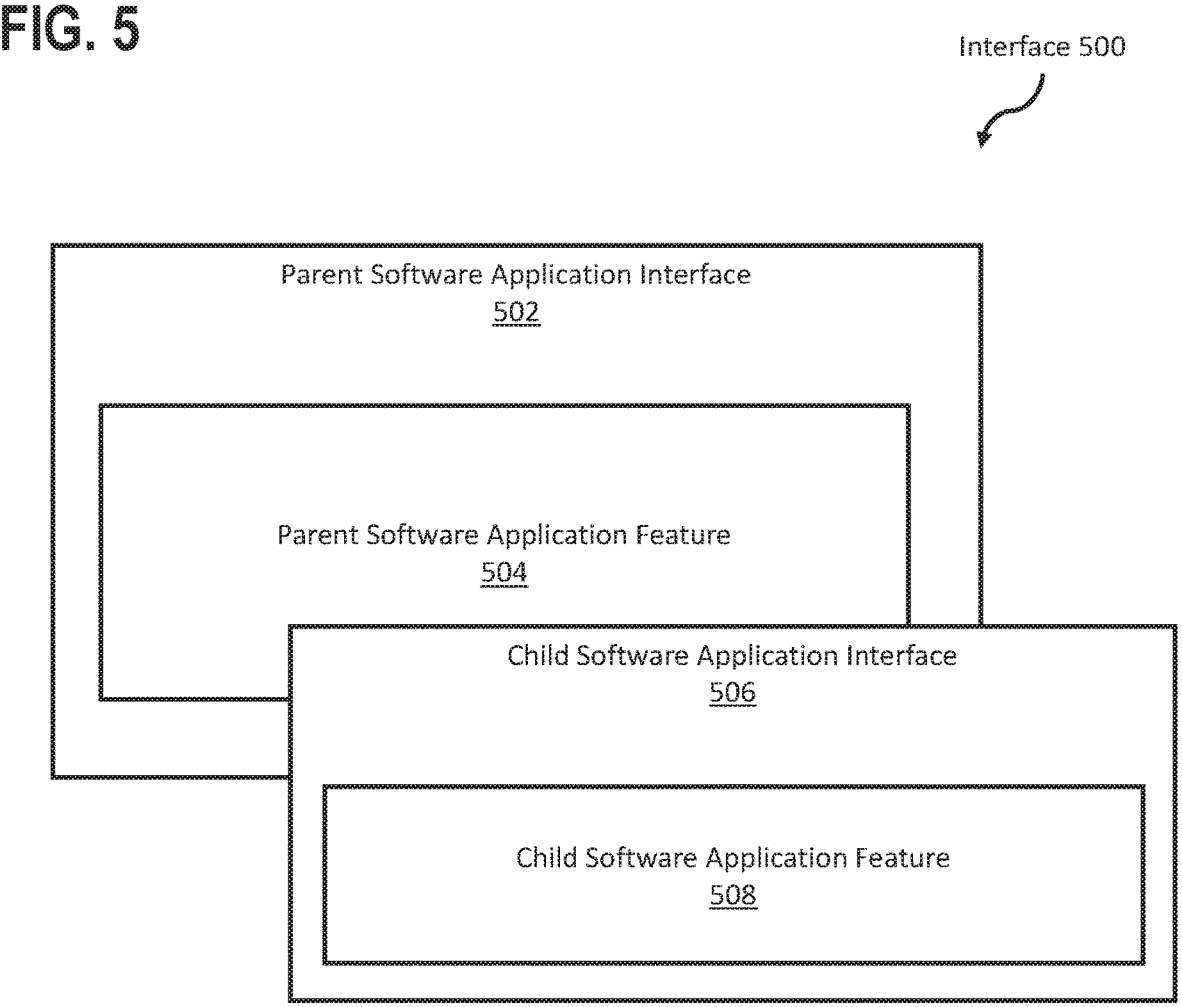
FIG. 5 illustrates an interface in accordance with one or more embodiments.

FIG. 5 illustrates an interface 500 in accordance with one or more embodiments. As illustrated in FIG. 5, a parent software application interface 502 includes a parent software application feature 504. The parent software application feature 504 is a feature that is native to the parent software application and rendered as part of the parent software application interface 502, regardless of whether any child software application is/are integrated with the parent software application. In this example, a child software application interface 506 is integrated into the parent software application interface 502. The child software application interface 506 is rendered as separate interface window visually associated with the parent software application interface 502, such as in a pop-up window. The child software application interface 506 includes a child software application feature 508. The child software application feature 508 includes functionality that is based, at least in part, on context supplied by the parent software application via an injected instance of a data structure.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
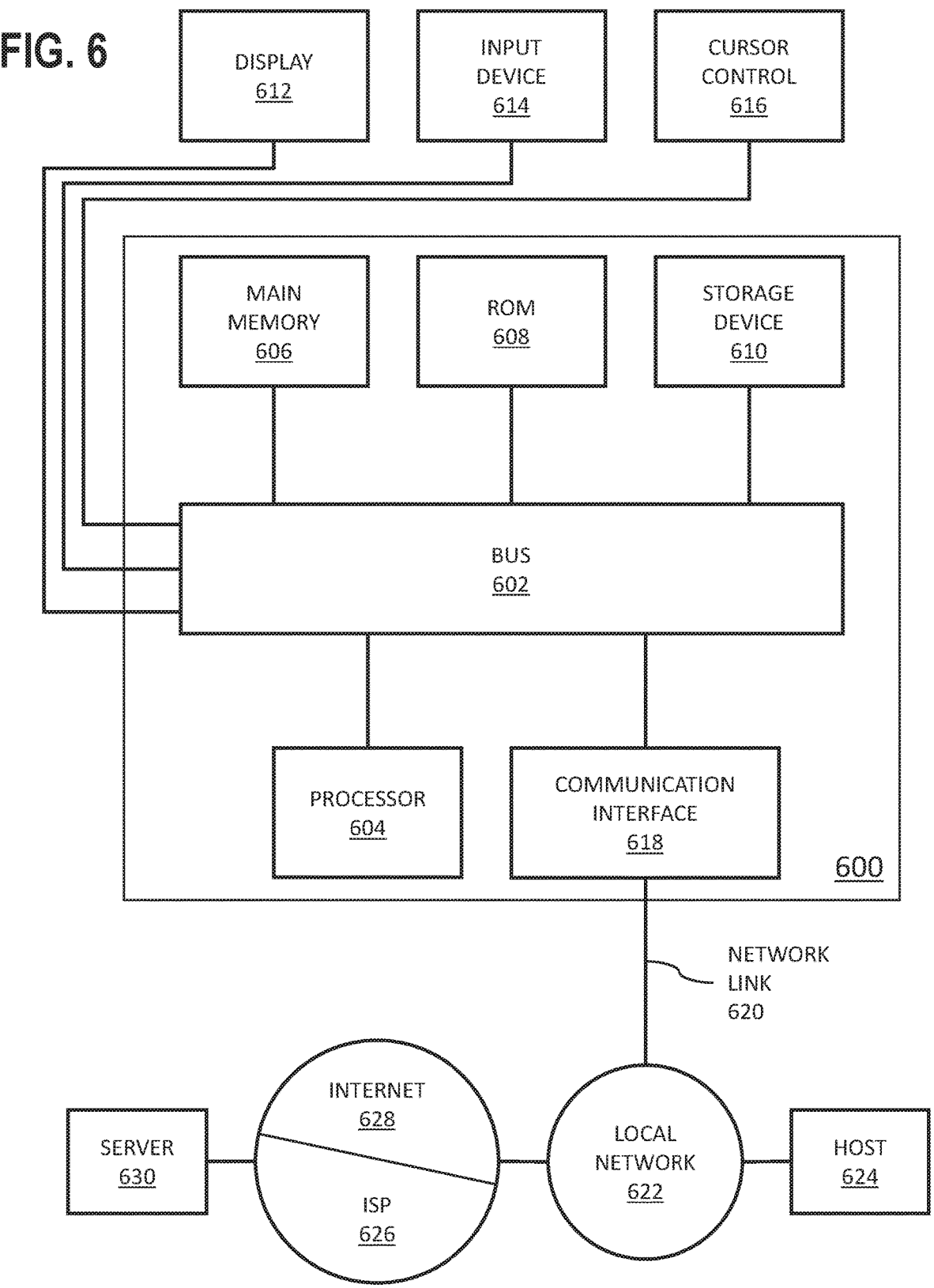
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold. [90] In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
generating a first mapping of a first subset of one or more variables of a parent software application to corresponding variables of a first child software application to configure a first interface of the first child software application for subsequent rendering in a second interface of a parent software application, wherein:
the first child software application is different than the parent software application;
the first mapping is based on names of the one or more variables of the parent software application and names of the corresponding variables of the first child software application;
the variables are selected from a plurality of variables managed by the parent software application, and used by the first child software application;
at runtime of the parent software application, based on the first mapping, populating an instance of a first data structure with one or more runtime values corresponding to the first subset of one or more variables of the parent software application;
injecting the instance of the first data structure into the first child software application;
generating, by the first child software application, a first interface of the first child software application based at least on the one or more values from the instance of the first data structure; and
rendering the first interface of the first child software application within the second interface of the parent software application.

2. The non-transitory computer readable medium of claim 1, the operations further comprising:
generating a second mapping of a second subset of one or more variables of the parent software application to corresponding variables of a child application, the variables selected from the plurality of variables managed by the parent software application;
at runtime of the parent software application, based on the second mapping, populating an instance of a second data structure with one or more runtime values corresponding to the second subset of one or more variables;
injecting the instance of the second data structure into a second child software application, the injecting enabling availability of the runtime values of the second subset of variables by the second child software application upon execution of the second child software application; and
generating a second interface of the second child software application based at least on the one or more values from the instance of the second data structure; and
rendering the second interface of the first child software application within the second interface of the parent software application.

3. The non-transitory computer readable medium of claim 2, wherein rendering operation comprises rendering the first interface and rendering the second interface concurrently.

4. The non-transitory computer readable medium of claim 1, the operations further comprising:
receiving, by an application server associated with the parent software application, one or more files corresponding to the first child software application; and
responsive to receiving the one or more files, registering the first child software application as an object available within the parent software application.

5. The non-transitory computer readable medium of claim 4, the operations further comprising:
determining, before registering the first child software application, that the one or more files do not violate one or more child software application restrictions associated with the parent software application.

6. The non-transitory computer readable medium of claim 1, the operations further comprising:
restricting access to the first child software application based on one or more security roles associated with a plurality of users of the parent software application.

7. The non-transitory computer readable medium of claim 1, wherein the parent software application is written using a first programming language and the first child software application is written using a second programming language that is different from the first programming language.

8. The non-transitory computer readable medium of claim 1, wherein injecting the instance of the first data structure into the first child software application comprises injecting, at runtime, the instance of the first data structure into source code of the first child software application.

9. The non-transitory computer readable medium of claim 8, wherein the source code of the first child software application comprises hypertext markup language, and wherein injecting the instance of the first data structure into the source code of the first child software application comprises injecting scripting language corresponding to the instance of the first data structure into the hypertext markup language.

10. The non-transitory computer readable medium of claim 9, wherein:
the first child software application generates server-side HTML code for rendering an HTML interface; and the parent software application generates a client-side script that includes the first data structure, the client-side script injected into the HTML code of the first child software application.

11. The non-transitory computer readable medium of claim 1, wherein injecting the instance of the first data structure into the first child software application comprises passing the instance of the first data structure from the parent software application to the first child software application via a query string.

12. The non-transitory computer readable medium of claim 11, wherein the query string comprises values of at least one variable and a corresponding runtime value of the variable corresponding to the first data structure.

13. The non-transitory computer readable medium of claim 1, the operations further comprising:
receiving, via the first child software application, user input to launch a second child software application; and
rendering, responsive to the user input, an interface of the second child software application as part of the parent software application.

14. The non-transitory computer readable medium of claim 1, the operations further comprising:
receiving, via the parent software application, user input defining the first mapping of variable names of the first subset of one or more variables of the parent software application to corresponding variable names in the first child software application, the first mapping of variable names stored as the first data structure.

15. The non-transitory computer readable medium of claim 1, the operations further comprising:
injecting, by the parent software application, one or more user interface controls into the interface of the first child software application.

16. The non-transitory computer readable medium of claim 1, wherein rendering the first interface of the first child software application within the second interface of the parent software application comprises rending the interface of the first child software application as an interface widget associated with the parent software application.

17. The non-transitory computer readable medium of claim 1, wherein rendering the first interface of the first child software application within the second interface of the parent software application comprises launching the child first software application in a window separate from a main window of the parent software application.

18. The non-transitory computer readable medium of claim 1, wherein rendering the first interface of the first child software application within the second interface of the parent software application comprises rendering the interface of the first child software application in an iframe embedded in an interface of the parent software application.

19. The non-transitory computer readable medium of claim 1, the operations further comprising:
detecting a selection, by a user, of a hyperlink located outside of the parent software application, wherein the hyperlink comprises a query string corresponding to the instance of the first data structure, and
wherein rendering the first interface of the first child software application within the second interface of the parent software application is performed responsive to detecting the selection of the hyperlink.

20. The non-transitory computer readable medium of claim 1, wherein injecting the instance of the first data structure into the first child software application comprises:
requesting, by the first child software application via an application programming interface (API) of the parent software application, the instance of the first data structure; and
receiving, by the first child software application from the parent software application, the instance of the first data structure.

21. The non-transitory computer readable medium of claim 1, wherein the operations further comprise:
receiving an instruction selecting an element in the second interface of the parent software application;
responsive to the received instruction, populating an instance of the first data structure with a runtime value corresponding to the selected element; and
injecting the runtime value corresponding to the selected element into the first child software application.

22. The non-transitory computer readable medium of claim 1, wherein the instance of the first data structure is populated at least in response to receiving input to launch the first child software application.

23. The non-transitory computer readable medium of claim 1, wherein the first child software application is selected from a subset of a plurality of child software applications, the subset identifying child software applications configured for integration with the parent software application and the plurality of child software applications including child software applications not configured for integration.

24. The non-transitory computer readable medium of claim 1, wherein generating the first interface of the first child software application based on at least on the one or more values form the instance of the first data structure comprises displaying the first values within the first interface of the child software application that is rendered within the second interface of the parent software application.

25. A system comprising:
one or more hardware processors; and
one or more one or more non-transitory computer-readable media storing instructions, which when executed by the one or more hardware processors, cause execution of operations comprising:
generating a first mapping of a first subset of one or more variables of a parent software application to corresponding variables of a child software application to configure a first interface of the child software application for subsequent rendering in a second interface of a parent software application, wherein:
the child software application is different than the parent software application;
the first mapping is based on names of the one or more variables of the parent software application and names of the corresponding variables of the child software application;
the variables are selected from a plurality of variables managed by the parent software application, and used by the child software application;
at runtime of the parent software application, based on the first mapping, populating an instance of a first data structure with one or more runtime values corresponding to the first subset of one or more variables;
injecting the instance of the first data structure into the child software application;
generating, by the first child software application, a first interface of the child software application based at least on the one or more runtime values from the instance of the first data structure; and rendering the first interface of the child software application within the second interface of the parent software application.

26. A method comprising:
generating a first mapping of a first subset of one or more variables of a parent software application to corresponding variables of a child software application to configure a first interface of the child software application for subsequent rendering in a second interface of a parent software application, wherein:
 the child software application is different than the parent software application;
 the first mapping is based on names of the one or more variables of the parent software application and names of the corresponding variables of the child software application;
 the variables are selected from a plurality of variables managed by the parent software application and used by the child software application;

at runtime of the parent software application, based on the first mapping, populating an instance of a first data structure with one or more runtime values corresponding to the first subset of one or more variables;

injecting the instance of the first data structure into the child software application; and generating, by the first child software application, a first interface of the child software application based at least on the one or more runtime values from the instance of the first data structure and rendering the first interface of the child software application within the second interface of the parent software application, wherein the method is performed by at least one device comprising a hardware processor.

* * * * *

UNITED STATES PATENT AND TRADEMARK OFFICE
CERTIFICATE OF CORRECTION

PATENT NO. : 10,984,079 B2  
APPLICATION NO. : 15/879646  
DATED : April 20, 2021  
INVENTOR(S) : Shakespeare et al.

Page 1 of 1

It is certified that error appears in the above-identified patent and that said Letters Patent is hereby corrected as shown below:

On the Title Page

On page 2, Column 2, Item (56) under Other Publications, Line 1, delete "Dimitriy" and insert -- Dmitry --, therefor.

On page 2, Column 2, Item (56) under Other Publications, Line 2, delete "Shestaskov" and insert -- Shestakov --, therefor.

In the Specification

In Column 4, Line 44, delete "XML," and insert -- XML --, therefor.

In the Claims

In Column 19, Lines 46-47, in Claim 17, delete "child first" and insert -- first child --, therefor.

In Column 20, Line 33, in Claim 24, delete "form" and insert -- from --, therefor.

In Column 20, Line 39, in Claim 25, delete "one or more one or more" and insert -- one or more --, therefor.

In Column 22, Line 7, in Claim 26, after "application;" delete "and".

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*